UNITED STATES PATENT OFFICE.

EMIL SCHEITLIN, OF ALTSTETTEN, NEAR ZURICH, SWITZERLAND.

METHOD OF MAKING 1-PHENYL-2.3-DIMETHYL-4-SULFAMINO-5-PYRAZOLONE AND ITS SALTS.

No. 930,091.      Specification of Letters Patent.      Patented Aug. 3, 1909.

Application filed July 11, 1907. Serial No. 383,231. (Specimens.)

*To all whom it may concern:*

Be it known that I, EMIL SCHEITLIN, a citizen of the Republic of Switzerland, residing at Altstetten, near Zurich, Switzerland, have invented certain new and useful Improvements in Methods of Making 1-Phenyl-2.3-Dimethyl-4-Sulfamino-5-Pyrazolone and Its Salts; and I do hereby declare the following to be a full, clear, and exact description of the invention, such as will enable others skilled in the art to which it appertains to make and use the same.

My invention relates to a new product and its method of manufacture, the same being a new chemical compound denominated as 1-phenyl-2.3-di-methyl-4-sulf-amino-5-pyrazolone, used as a pharmaceutical preparation and in photography.

I have found that 1-phenyl-2.3-di-methyl-4-nitroso-5-pyrazolone when treated with a suitable bi-sulfite, as sodium bi-sulfite, is readily converted into its sulf-amino combination in accordance with the following reaction:

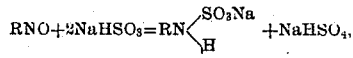

R in the foregoing equation representing the antipyrin radical.

The resulting sodium acid sulfate, $NaHSO_4$ is converted into sodium sulfate by an excess of sodium bi-sulfite, setting free sulfur-di-oxid, as follows:

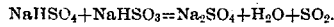

It has not heretofore been known to decompose a nitroso group by the action of sodium bi-sulfite, for the purpose of forming a sulf-amino combination, and this method of reduction is very advantageous by reason of the facility with which it may be carried out. The resulting product when properly separated contains no impurity.

From solutions of the product containing hydrochloric acid and sodium chlorid, the sulf-amino combination crystallizes in fine needle-like crystals, and the whole solution quickly becomes thick with these crystals. The crystals are white, and when heated to about 140° C. begin to decompose, and at about 180° to 190° they turn blue-brown to black, and at a higher temperature they begin to turn to carbon.

The sulf-amino combination is quite stable against the action of dilute mineral acids in the cold, but when heated with dilute mineral acids to about 40° to 50° C., they are gradually hydrolized with the formation of sulfuric-amino-pyrazolone. This action takes place quickly on a water bath.

Concentrated sulfuric acid dissolves the crystals with the formation of a yellow solution unaltered by slight heating. On the addition of water the solution assumes the color of a very dilute permanganate solution, a sign that sulfuric-amino-pyrazolone has been formed.

The sulf-amino-combination gives with a solution of iron-chlorid an intense orange-red color, that sharply distinguishes this compound from the coloring obtained by iron chlorid and amino-pyrazolone. With alkalies it forms alkaline salts readily soluble in water, but insoluble in concentrated alkaline solutions. It is insoluble in sodium-chlorid solutions; in pure water and alcohol the crystals are soluble with difficulty and very slowly, and likewise insoluble in the other usual organic solvents, as benzol, toluol, acetone, ligroin, etc.

This new, sulf-amino-pyrazolone is used as such and in the form of its salts. It is also used as a starting material for 1-phenyl-2.3-di-methyl-4-amino-5-pyrazolone and other derivatives, and in many cases it need not be separated from its solution. As an example, to the 1-phenyl-2.3-di-methyl-4-nitroso-5-pyrazolone, derived from 188 parts of 1-phenyl-2.3-di-methyl-5-pyrazolone and which need not be separated from its solution, is added 1000 volumes of concentrated sodium bi-sulfite solution, and the mixture is boiled until sulfur-di-oxid is no longer given off and the solution is only slightly yellow. The solution is then evaporated in an open vessel or in vacuum until it is reduced to one-third or one-fourth its volume, according to whether a concentrated or a dilute solution has been used for the formation of 1-phenyl-2.3-di-methyl-4-nitroso-5-pyrazolone. The end of evaporation is indicated by the formation of a scum of sodium sulfate on the solution. The solution is then cooled and separated from the sodium sulfate crystals formed, and mixed with 330 volumes of concentrated hydrochloric acid (HCl) whereby the remaining excess of sodium bi-sulfite is decomposed with the formation of sodium chlorid and the liberation of sulfur di-oxid,

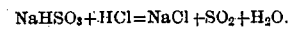

After standing for about twenty-four hours the crystals of 1-phenyl-2.3-di-methyl-4-sulfite-amino-5-pyrazolone are separated from the mother liquor, preferably, but not necessarily, by pressing, and the crystals washed with a little water and alcohol. After allowing the solution to stand for a longer time the residue of the sulf-amino-pyrazolone is crystallized out. The acid is monobasic and readily forms salts with bases or carbonates.

My new product is useful as a medicine in cases of fevers, the dose being about 0.50 g. several times a day, and in photography as a developer, being used in the same proportions as metol; and its graphic formula may be represented as follows:—

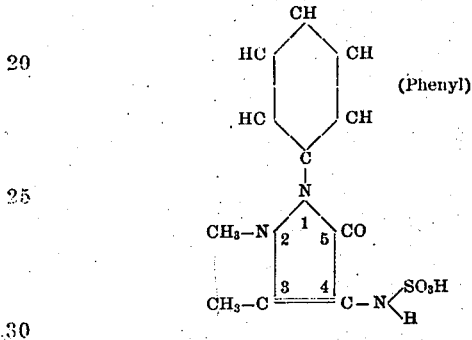

I claim—

1. The process of making 1-phenyl-2.3-di-methyl-4-sulf-amino-5-pyrazolone, which comprises reacting upon 1-phenyl-2.3-di-methyl-4-nitroso-5-pyrazolone with a bi-sulfite of a metal, to convert the nitroso group thereof into the sulf-amino-group.

2. The process of making 1-phenyl-2.3-di-methyl-4-sulf-amino-5-pyrazolone, which consists in reacting upon 1-phenyl-2.3-di-methyl-4-nitroso-5-pyrazolone with sodium bi-sulfite at a temperature above normal.

3. As a new product, 1-phenyl-2.3-di-methyl-4-sulf-amino-5-pyrazolone, a white crystalline compound, giving with iron chlorid an intense orange-red color and capable of acting as a photographic developer.

4. The process of making 1-phenyl-2.3-di-methyl-4-sulf-amino-5-pyrazolone, which consists in reacting upon 1-phenyl-2.3-di-methyl-4-nitroso-5-pyrazolone with a bi-sulfite of an alkaline metal at a temperature above normal.

In testimony that I claim the foregoing as my invention, I have signed my name in presence of two subscribing witnesses.

EMIL SCHEITLIN.

Witnesses:
  A. LIEBERKNECHT,
  WERNER DIETRICH.